United States Patent [19]

Debrunner, Jr.

[11] Patent Number: 4,520,843

[45] Date of Patent: Jun. 4, 1985

[54] FLOW CONTROL VALVE

[75] Inventor: Paul E. Debrunner, Jr., Thousand Oaks, Calif.

[73] Assignee: Rockwell International Corporation, El Segundo, Calif.

[21] Appl. No.: 583,561

[22] Filed: Feb. 27, 1984

[51] Int. Cl.³ .............................................. F16K 17/20
[52] U.S. Cl. .................................... 137/469; 137/472; 137/494; 137/512.2
[58] Field of Search ............... 137/469, 472, 473, 494, 137/512.2

[56] References Cited

U.S. PATENT DOCUMENTS

| | | | |
|---|---|---|---|
| 807,269 | 12/1905 | Hildebrand | 137/512.2 X |
| 2,320,339 | 6/1943 | Buttner | 137/469 |
| 2,845,945 | 8/1958 | Mancosi | 137/469 |
| 3,048,188 | 8/1962 | Hunter | 137/469 |
| 3,330,297 | 7/1967 | Mowbray | 137/469 |
| 3,446,238 | 5/1969 | Norstrud | 137/469 |
| 3,856,041 | 12/1974 | Cryder | 137/512.2 X |
| 4,432,389 | 2/1984 | Jackson | 137/469 |

Primary Examiner—Harold W. Weakley
Attorney, Agent, or Firm—H. Frederick Hamann; Harry B. Field

[57] ABSTRACT

The present invention comprises a valve body (24) with an inlet (28) and an outlet (30), and an inlet-closing poppet (32) moveably disposed within a chamber (26) in the valve body, the poppet incorporating a piston head (34) whose face (36) opposes the inlet and from which projects a plug (62) for closing-off the inlet (28) from the remainder of the piston face (36) when the poppet is at its inlet-closing position. A spring (54) urges the poppet towards its inlet-closing position with sufficient force to keep the inlet closed until the fluid reaches a preselected cracking pressure, whereupon the spring allows the poppet to be displaced slightly, exposing the remainder of the piston face to the fluid. The action of the fluid on the piston face is then sufficient to drive the poppet fully back to an annular stop (60) provided within the valve body whose engagement also serves as a partial seal about the periphery (70) of the piston. One or more small channels (58) formed in the piston head direct fluid from the face of the piston to its backside with sufficient pressure drop to assure that the poppet will remain situated against the stop. In the preferred embodiment, these passages lead into the interior of a hollow, reciprocable connector (40) which both lends support to the piston but also serves as a conduit towards the outlet of the valve.

6 Claims, 4 Drawing Figures

FLOW CONTROL VALVE

BACKGROUND OF THE INVENTION

1. Field of the Invention

The present invention relates to flow control valves generally and more specifically to flow control valves suitable for use in downhole steam generators whose actions snap either to a fully opened position or to a fully closed position.

2. Description of the Prior Art

As a result of past oil shortages, interest has been directed towards the development of downhole steam generator systems for effecting steam simulation in domestic oil reservoirs. Such systems include for example the one set forth in U.S. Pat. No. 4,336,839 to Wagner et al.

In most downhole steam generator systems, a pump at ground-level pumps fuel to the wellhead and down a stringer to the downhole steam generator unit. Prior to a firing of the steam generator, the entire stringer is usually charged with fuel, creating a static column of fluid of 2,500 feet or more. A check valve provided at the base of the stringer serves to prevent fuel flow into the combustor until the proper moment. As the combustor is to be fired, the pump at the wellhead begins applying an overpressure which, in prior art systems, causes the check valve to open and discharge fuel into the combustor.

However, prior art check valves have proven to be very unsatisfactory in downhole steam generators for several interrelating reasons. First of all, such valves are designed primarily to prevent reverse flow, which means that they are designed to have reseating pressures which are characteristically close to their cracking pressures. Consequently, they tend to modulate between their fully opened and closed positions in response to fluid oscillations in the column of fluid passing therethrough. At the intermediate positions, certain elements of these valves are prone to chatter, and chatter is very detrimental to the service life and/or sealing qualities of the valve. These considerations are of special concern in downhole steam generators, because the improper functioning of a valve or its early demise can mean that the whole downhole steam generator unit must be pulled from the well for servicing, a costly task for the operator. Of almost equal concern is that a modulating valve will cause cyclical variations in the rate at which fuel is discharged into the combustor, which effect can ruin combustor performance.

Moreover, the working environment of the downhole steam generator is extremely dirty and filled with caustic gases and fluids. Thusly, any valves used therein must be capable of handling substantial particulate contamination without jamming or the like. Check valves have proven unsatisfactory in meeting these additional demands.

Another problem attendant with the use of check valves in downhole steam generator systems is that the pressure drop across the typical check valve rises in proportion to the flowrate therethrough. Consequently, the ground-level pump must overcome more and more pressure loss as it provides increasingly greater flowrates to the combustor. This additional demand on the pump is undesirable for reasons which are obvious.

OBJECTS OF THE INVENTION

It is therefore an object of the present invention to provide a flow control valve suitable for use in a downhole steam generator which will not chatter nor jam despite continued use.

It is therefore another object of the present invention to provide a flow control valve whose cracking pressure is significantly greater than its reseating pressure so that its internal parts do not modulate nor chatter.

It is still another object of the present invention to provide a flow control valve whose action goes from either fully closed or fully opened, and will not modulate between those positions.

Still another object of the present invention is to provide a flow control valve which can be made to fit within the confines of a well casing yet remain resistive to jamming from the particulates therein.

Yet another object of the present invention is to provide a flow control valve which lends itself to in-line installation and whose simplicity makes it resistive to jamming.

A further object of the present invention is to provide a flow control valve which limits the amount of pressure drop across the valve at the higher levels of flowrate.

Still another object of the present invention is to provide a flow control device which can hold back an extremely high column of fluid, yet snap fully open when a preselected overpressure is applied to the column of fluid.

Yet another object of the present invention is to provide a flow control valve which has a great dependability and a long service life.

SUMMARY OF THE INVENTION

These and other objects are achieved by the flow control valve of the present invention which comprises a valve body having an internal chamber with an inlet and an outlet, and an inlet closing poppet moveably disposed within the chamber. The poppet incorporates a piston head whose face opposes the inlet and from which projects a plug for closing-off the inlet from the remainder of the piston face when the poppet is at its inlet-closing position. A biasing means urges the plug against the walls defining the inlet with sufficient force to keep the inlet closed until the fluid reaches a preselected cracking pressure, whereupon the biasing means allows the poppet to be displaced slightly, exposing the reaminder of the piston face to the fluid. The action of the fluid on the piston face is then sufficient to drive the poppet fully back to an annular stop provided within the valve body whose engagement also serves as a partial seal about the periphery of the piston. One or more small channels formed in the piston head direct fluid from the face of the piston to its backside with sufficient pressure drop to assure that the poppet will remain situated against the stop. In the preferred embodiment, these passages lead into the interior of a hollow, reciprocable connector which both lends support to the piston head but also serves as a conduit towards the outlet of the valve.

Other objects, advantages and novel features of the present invention will become apparent from the following detailed description of the invention when considered in conjunction with the accompanying drawing.

DETAILED DESCRIPTION OF THE PREFERRED EMBODIMENTS

Figure 4:
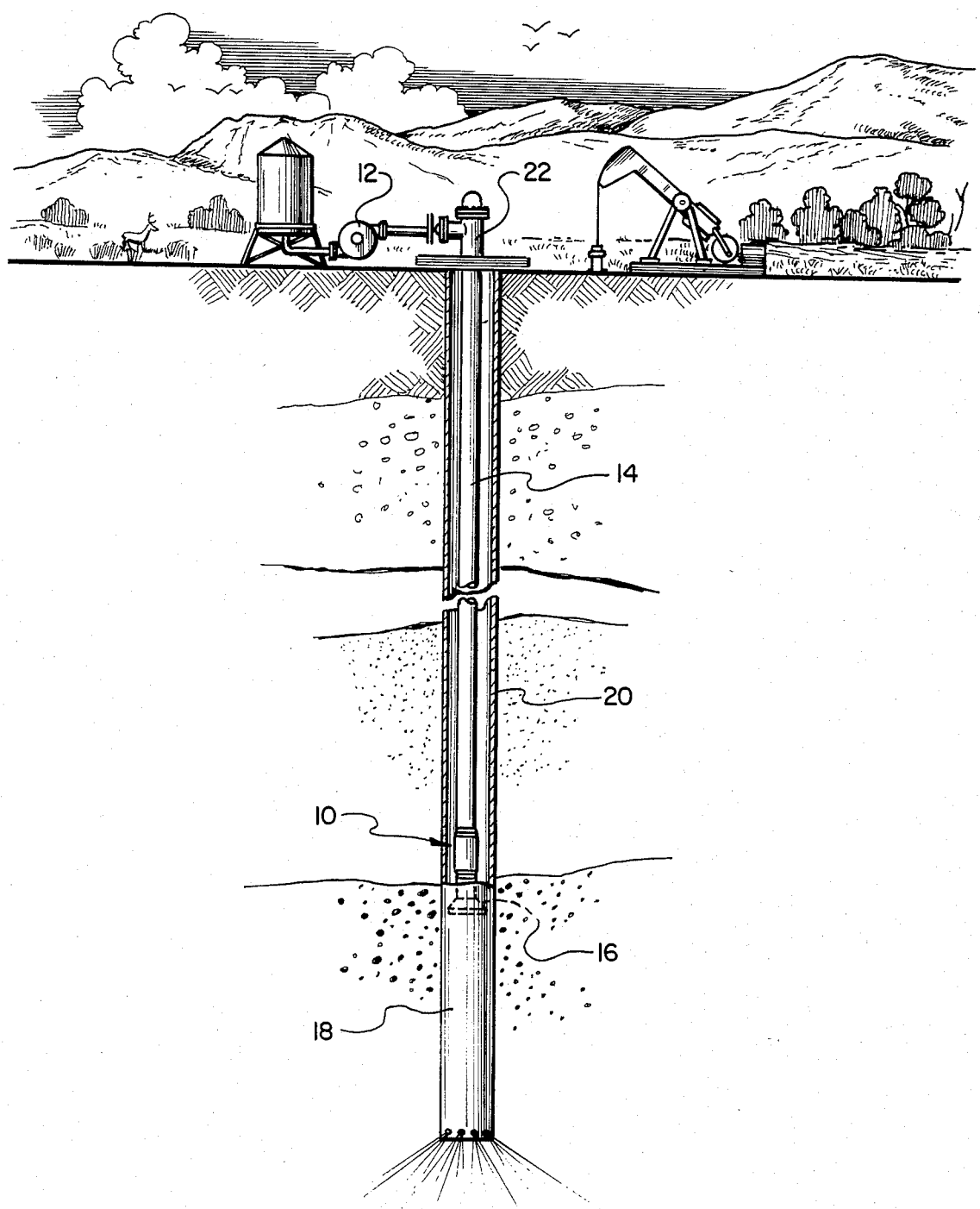
FIG. 4 is a representation of a downhole steam generator system employing the flow control valve of FIG. 1.

Referring to FIG. 4, the present invention provides a flow control valve 10 for controlling the flow of fuel (or, in some instances, liquid oxidizer) to be pumped by pump 12 down stringer 14 into combustor 16 of downhole steam generator unit 18 situated in well casing 20. It is to be realized that in actuality, flow control valve 10 would likely be integrated into steam generator unit 18 and would be proportionally smaller than shown in FIG. 4 due to the allocation of space within casing 20 to other components and pipes which have been omitted from FIG. 4 for sake of clarity.

Prior to firing of steam generator unit 18, stringer 14 is usually charged with a column of fluid extending all the way up from flow control valve 10 to wellhead 22. Accordingly, flow control valve 10 is designed to remain fully closed and support the aforementioned column of fluid until a preselected overpressure (cracking pressure) is created in the fluid by pump 12 whereupon flow control valve 10 snaps open fully. Valve 10 remains fully open until the pump 12 shuts down and the delivered pressure drops far below the cracking pressure whereupon valve 10 closes fully.

Figure 1:
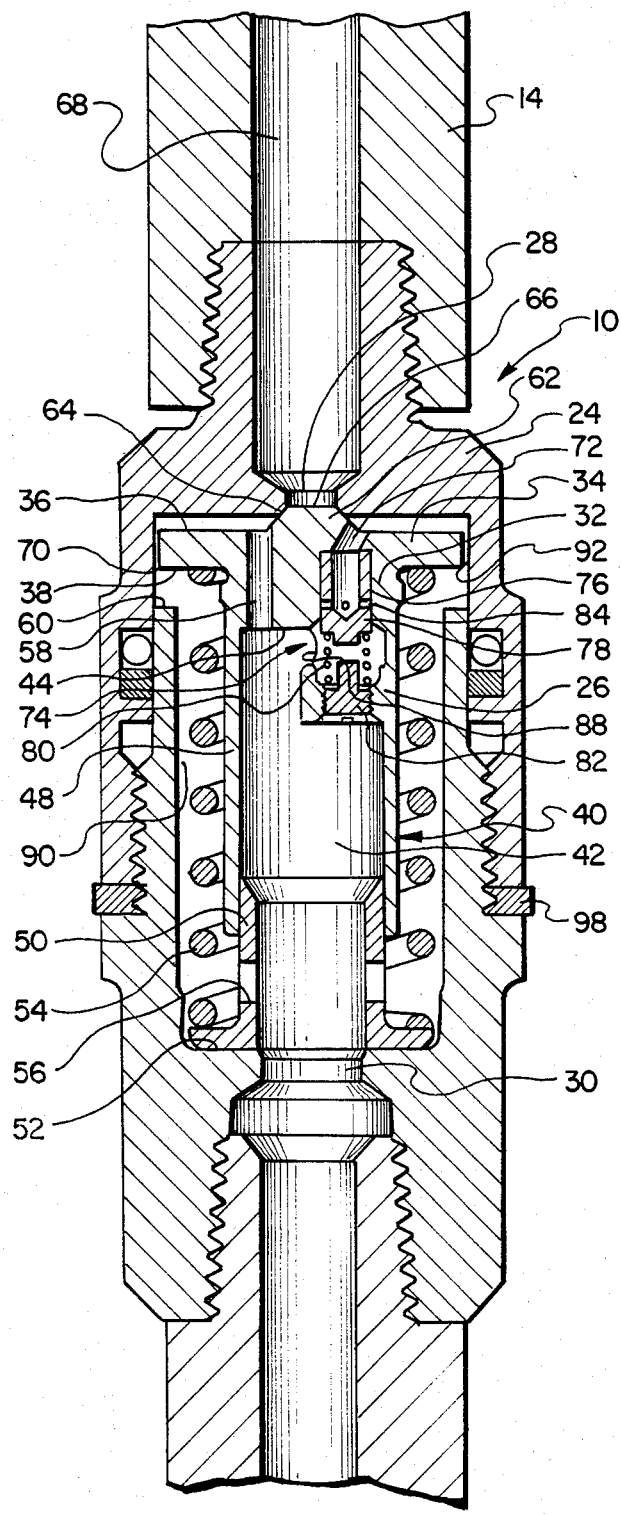
FIG. 1 is a cross-sectional side-view of a flow control valve constructed according to the preferred embodiment of the present invention wherein the poppet is at its inlet-closing position.
Figure 2:
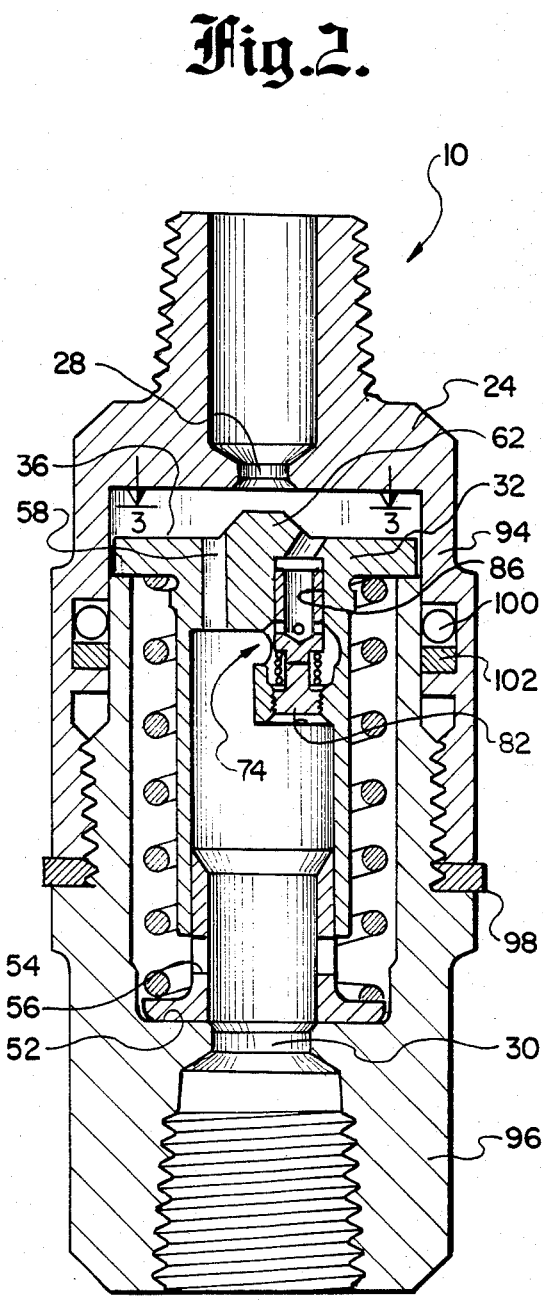
FIG. 2 is a cross-sectional side-view of the control valve shown in FIG. 2 but wherein said valve is opened.

Referring to FIGS. 1 and 2, flow control valve 10 comprises a valve body 24 having an internal chamber 26, an inlet 28 leading into chamber 26 and an outlet 30 situated at the end of chamber 26 opposite from inlet 28. Poppet 32 is axially movable within chamber 26 and features a piston head 34 having a face 36 opposing inlet 28 and a backside 38 from which extends a hollow, reciprocable connector 40 which lends support and guidance to piston head 34 while also forming a channel 42 leading from a central portion 44 of backside 38 of piston head 34 to outlet 30. In the preferred embodiment, reciprocable connector 40 comprises stem 48 which projects from backside 38 of piston head 34 and which telescopingly slides over a portion of guidepiece 50. Guidepiece 50 is fixedly placed against end wall 52 of valve body 24 by the action of spring 54. Holes 56 in guidepiece 50 are not covered by stem 48 during the movement of poppet 32.

Channels 58 extending through piston head 34 from face 36 to central portion 44 of backside 38 convey fluid through piston head 34 and empties it into channel 42 from whence the flow proceeds to outlet 30. Channels 58 are sized and numbered to favorably create sufficient pressure drop across piston head 34 so that the pressure force acting on face 36 when poppet 32 is retracted is always sufficient to force poppet 32 against annular stop 60.

Projecting from face 36 of piston head 34 is an annular plug 62 which sealingly engages seat 64 about inlet 28 when poppet 32 is at its inlet-closing position shown in FIG. 1. Plug 62 serves to close-off inlet 28 from the remainder of face 36 so that the hydrostatically induced forces acting upon surface 66 of plug 62 are not applied to the remainder of face 36. Spring 54 which serves as the means for urging poppet 32 towards its inlet-closing position, provides sufficient upwardly acting force to overcome the downwardly acting force on surface 66 induced by the column of fluid 68 situated in stringer 14. When a stringer extending 2500 feet into a well is charged with fuel, the hydrostatic pressure at surface 66 might reach approximately 950 psi. It is also to be noted that valve 10 is preferably threaded to stringer 14.

As pump 12 increases the pressure at inlet 28 to a predetermined cracking pressure, a downwardly acting force is exerted upon surface 66 of plug 62 which is sufficient to displace poppet 32 downwardly a small amount, thus exposing the remainder of face 36 of piston head 34 to the fluid. Since the same pressure is now acting upon a larger area, sufficient force is generated on face 36 to push poppet 32 all the way back to annular stop 60 formed at a fixed location within chamber 26. Annular stop 60 is provided not only to stop further movement of poppet 32, but also to engage periphery 70 of piston head 34 to form at least a partial seal about periphery 70. As previously mentioned, channels 58 are provided in such size and number as to create sufficient pressure differential between the fluid adjacent face 36 and the fluid adjacent backside 38 such that poppet 32 is continuously pressed against stop 60 until the pressure drops well below the cracking pressure. This reseating pressure is less than the cracking pressure by a factor equal to the ratio of the area of surface 66 of plug 62 with respect to the total area of face 36 (which also includes surface 66). Because the reseating pressure is much smaller than the cracking pressure, poppet 32 will not tend to lift off stop 60 during operation of valve 10, even when the fluid in stringer 14 undergoes substantial variations in pressure as might occur if the smooth operation of pump 12 is interrupted or some other externality occurs.

Figure 3:
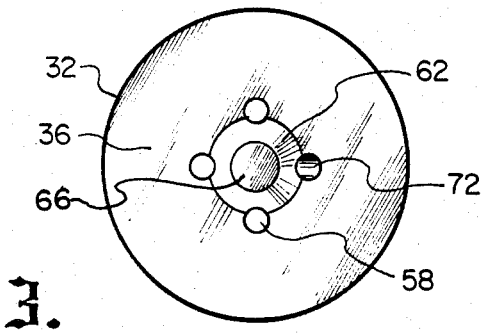
FIG. 3 is a frontal view of the piston head of the flow control valve shown in FIG. 3.

Referring now to FIGS. 1 and 3, channels 58 in piston face 36 of the preferred embodiment number a total of four, with one of them, passage 72, being openable only upon the action of a relief valve 74. Relief valve 74 serves to reduce the rate at which the pressure drop across piston head 34 increases with respect to increases in flow through valve 10 beyond a predetermined flow-rate. Relief valve 74 comprises a cylindrical plug 76 having a closed end 78, a spring 80 which serves to urge plug 76 upwardly to a closed position and set screw 82 which allows adjustment of the biasing action of spring 80. Holes 84 in cylindrical plug 76 are closed by the walls 86 until the fluid at piston face 36 obtains sufficient pressure (which is significantly above the cracking pressure of valve 10) to force plug 76 downwardly, whereupon holes 84 are positioned adjacent exits 88 and are thusly communicated with channel 42 of connector 40. It is to be understood that at certain pressures, poppet 32 will be at its retracted position as shown in FIG. 2, yet pressure relief valve 74 might be closed.

Holes 56 in guidepiece 50 serve to communicate the pressure of fluid proximate to outlet 30 to portion 90 of chamber 26 external to stem connector 40 and behind piston head 34, thus allowing any leakage about periphery 70 of piston head 34 to escape through outlet 30. Accordingly, pressure is not allowed to build-up on backside 38 of piston head 34, which pressure might otherwise force poppet 32 off stop 60 or otherwise resist the snapping-open action of poppet 32. Holes 56 can be placed just as effectively in stem 48 as in guidepiece 50.

From the above description, it can be appreciated that flow control valve 10 provides the desired snapping action with a wide range between its cracking and reseating pressures while also maintaining a simple design which is resistive to jamming. The resistance to jamming is further served by the coupling of the guiding effect of walls 92 adjacent piston head 34 and the guidance from the action of reciprocable connector 40. Moreover, since stop 60 forms a seal on the backside periphery of piston head 34, relatively large tolerances can be allowed between walls 92 and piston head 34 to thereby reduce the changes of jamming.

The cracking pressure of flow control valve 10 is adjusted by changing the amount by which upper body piece 94 is threaded into or out of lower body piece 96. The body pieces are then locked in place with locknut 98. This adjustment changes the overall length of valve body 24 which change in turn alters the tension in spring 54 when poppet 32 is at its inlet-closing position. Thusly, if flow control valve 10 is to be used at the base of very deep well, body pieces 94 and 96 would be threaded together prior to installation to increase the tension in spring 54 so that poppet 32 will remain at its inlet-closing position despite the greater static pressure at inlet 28.

Obviously, many modifications and variations of the present invention are possible in light of the above teachings. For instance, the flow through the valve could be directed along paths other than along channel 42 of connector 40, or the number and arrangement of channels 58 in piston head 34 might be changed. It is therefore to be understood that, within the scope of the appended claims, the invention may be practiced otherwise than as specifically described.

What is claimed and desired to be secured by Letters Patent of the United States is:

1. A flow control valve for holding a column of fluid until the pressure of said fluid reaches a preseleted cracking pressure, said control valve comprising:

a valve body having an internal chamber, an inlet at one end of said chamber for receiving said column of fluid and an outlet at the opposite end of said chamber for discharging said fluid from said valve;

a poppet axially movable within said internal chamber between an inlet-closing position and a retracted position, said poppet comprising a piston head having a face opposing said inlet and a plug projecting from said face, said plug closing-off said inlet from the remainder of said face when said poppet is at said inlet-closing position, said face being exposed to said fluid from said inlet when said poppet is moved from said inlet-closing position, said poppet further comprising at least one passage through said piston head for conveying said fluid from said face to a location on the backside of said piston head, an axially reciprocable, hollow connector extending from said backside and defining an interior channel in said poppet extending toward said other end of said valve body, said connector internally conveying fluid from said backside location to said oulet, and an annular hollow stem extending inward from said other end of said valve body slidably engaging the end of said connector to form a continuation of the interior channel defined by the connector;

an annular stop at a fixed location within said chamber for peripherally engaging said backside of said piston head when said poppet is at said retracted position to thereby prevent further axial movement of said poppet and to form at least a partial seal about the periphery of said piston head, said piston-head passage providing enough pressure drop in the fluid conveyed therethrough to assure that the poppet remains in its retracted position;

at least one hole in the wall of said stem for connecting the lower-pressure, other end of the valve body to a cavity between the backside of the piston head, the valve body and the hollow connector and for evacuating fluid leaking about the periphery of said piston head and biasing means for urging said poppet towards said inlet-closing position, said biasing means providing sufficient urging force to maintain said poppet at said inlet-closing position until said fluid achieves said cracking pressure, the surface area of said piston head being greater than that of said plug so that, when said plug is forced out of sealing contact with said inlet, said fluid pressure against said piston head exerts a substantially greater force on said piston head than the opposite force exerted thereon by said biasing means, thereby causing said poppet to snap into its retracted, fully open position.

2. The flow control valve as claimed in claim 1 wherein said biasing means is a spring.

3. The flow control valve as claimed in claim 2 wherein at least one of said passages through said piston head includes a pressure relief valve.

4. The flow control valve as claimed in claim 3 wherein said hollow, reciprocable connector member comprises a hollow valve stem extending longitudinally from said backside of said valve head and a tubular guidepiece fixed to said valve body at one end and telescopically engaged with said valve steam at its other end.

5. The flow control valve as claimed in claim 4 including a pressure relief valve located within said poppet comprising a plug, a biasing spring for urging said plug towards a closed position and a set screw for adjusting the tension of said biasing spring.

6. The flow control valve as claimed in claim 3 wherein the tension in said spring is adjustable.

* * * * *